(12) United States Patent
Georgis et al.

(10) Patent No.: US 12,469,154 B2
(45) Date of Patent: Nov. 11, 2025

(54) SEQUENCE STABILIZATION OF 3D POINT CLOUD FRAMES USING MOTION INFORMATION

(71) Applicant: SONY GROUP CORPORATION, Tokyo (JP)

(72) Inventors: Nikolaos Georgis, San Diego, CA (US); Keisuke Omori, Sunnyvale, CA (US); Kiyoharu Sassa, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 930 days.

(21) Appl. No.: 17/574,139

(22) Filed: Jan. 12, 2022

(65) Prior Publication Data

US 2023/0222677 A1 Jul. 13, 2023

(51) Int. Cl.
*G06T 7/33* (2017.01)
*G06T 7/20* (2017.01)

(52) U.S. Cl.
CPC .............. *G06T 7/344* (2017.01); *G06T 7/20* (2013.01); *G06T 2207/10016* (2013.01); *G06T 2207/10028* (2013.01); *G06T 2207/20224* (2013.01)

(58) Field of Classification Search
CPC . G06T 7/344; G06T 7/20; G06T 2207/10016; G06T 2207/10028; G06T 2207/20224; G06T 2207/30196; G06T 7/292; G06T 7/246

See application file for complete search history.

(56) References Cited

U.S. PATENT DOCUMENTS

| | | | |
|---|---|---|---|
| 7,548,659 B2 | 6/2009 | Ofek et al. | |
| 2015/0035820 A1* | 2/2015 | Le | G06T 17/00 |
| | | | 345/419 |
| 2016/0071318 A1* | 3/2016 | Lee | G06V 20/653 |
| | | | 345/419 |
| 2017/0094259 A1* | 3/2017 | Kouperman | H04N 13/111 |
| 2019/0188872 A1* | 6/2019 | Aflalo | G06T 7/593 |
| 2019/0213773 A1* | 7/2019 | Lee | H04L 67/535 |
| 2021/0377507 A1* | 12/2021 | Woo | H04N 13/383 |

(Continued)

FOREIGN PATENT DOCUMENTS

| | | |
|---|---|---|
| CN | 101375315 B | 3/2015 |
| WO | 2021/088481 A1 | 5/2021 |
| WO | WO-2022061850 A1 * | 3/2022 |

*Primary Examiner* — Ross Varndell
(74) *Attorney, Agent, or Firm* — CHIP LAW GROUP

(57) ABSTRACT

An electronic apparatus and method for sequence stabilization of point cloud frames using motion information is disclosed. The electronic apparatus receives image data that includes images of objects. The image data corresponds to a duration in which in the objects are in a dynamic state. Based on the image data, the electronic apparatus generates a point cloud sequence and extracts motion information associated with the objects. The electronic apparatus determines a first set of 3D points of a first point cloud frame that is in a static state with respect to a second set of 3D points of a second point cloud frame, based on the motion information. The first and second point cloud frames are consecutive frames of point cloud sequence. The electronic apparatus further determines a difference between the first and the second set of 3D points and updates the first point cloud frame based on the difference.

16 Claims, 5 Drawing Sheets

(56) References Cited

U.S. PATENT DOCUMENTS

2023/0080574 A1\*  3/2023  Li .............................. G06T 7/11
                                                              382/173
2023/0125042 A1\*  4/2023  D'Ercoli ................... G06T 7/73
                                                              382/128

\* cited by examiner

SEQUENCE STABILIZATION OF 3D POINT CLOUD FRAMES USING MOTION INFORMATION

CROSS-REFERENCE TO RELATED APPLICATIONS/INCORPORATION BY REFERENCE

None.

FIELD

Various embodiments of the disclosure relate to volumetric videos and dynamic point clouds. More specifically, various embodiments of the disclosure relate to an electronic apparatus and method for sequence stabilization of 3D point cloud frames using motion information.

BACKGROUND

Advancements in computing and imaging technology have led to development of various techniques for generation of volumetric videos using high-quality 3D scans (i.e., point clouds). In many cases, 3D Volumetric video may be created based on concatenation of many 3D models created independently with no or limited temporal corrections. In some cases, there may be a noticeable discontinuity between frames of the 3D volumetric video. Such discontinuity may affect user experience.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for sequence stabilization of 3D point cloud frames using motion information is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
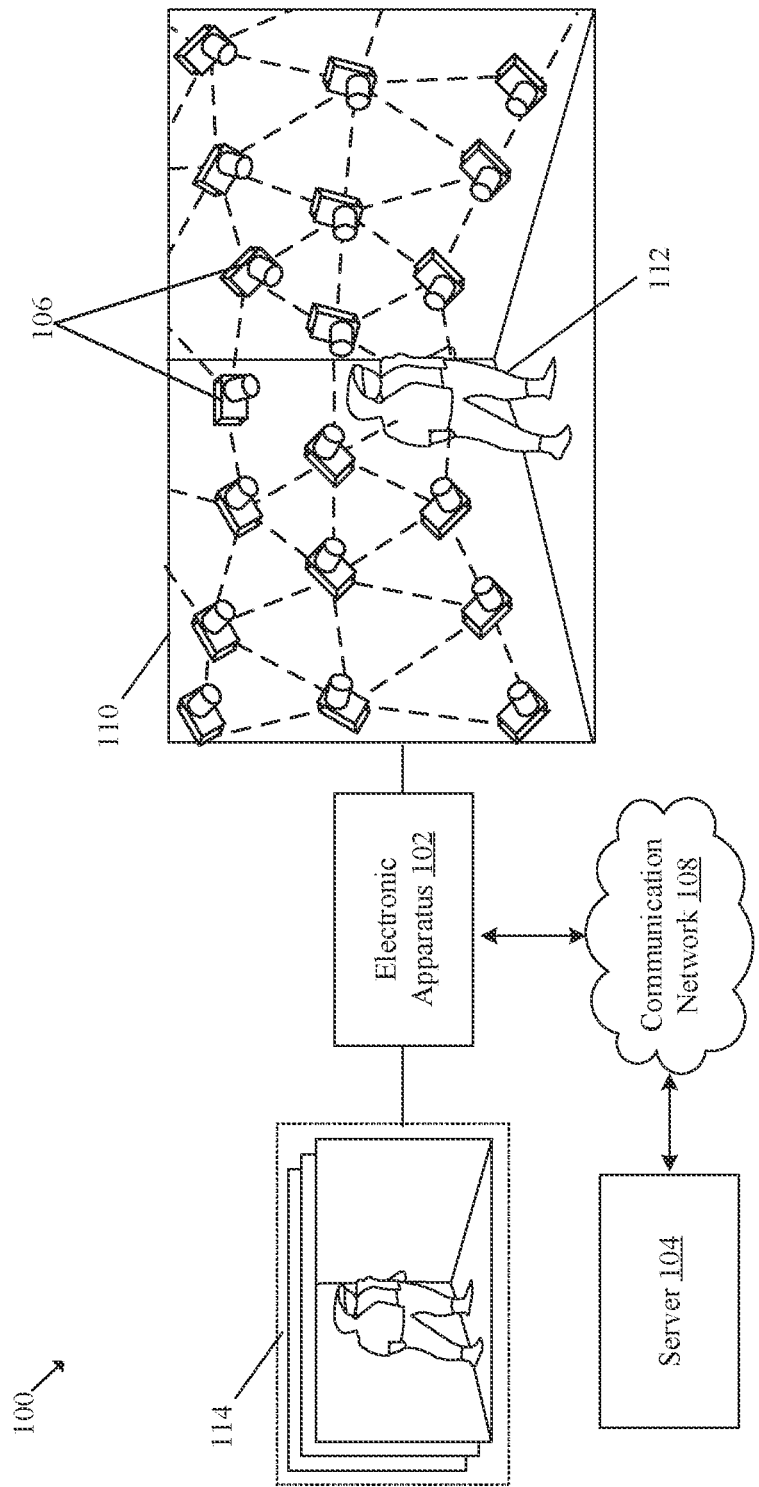
FIG. 1 is a diagram that illustrates an exemplary network environment for sequence stabilization of 3D point cloud frames using motion information, in accordance with an embodiment of the disclosure.

The following described implementation may be found in the disclosed electronic apparatus and method for sequence stabilization of 3D point cloud frames using motion information. Exemplary aspects of the disclosure provide an electronic apparatus, which may provide a method for sequence stabilization of 3D point cloud frames using motion information. The electronic apparatus (for example, a computing device, a tablet, and the like) may be configured to receive image data that includes images of one or more objects. The image data may correspond to a duration in which the one or more objects may be in a dynamic state. As an example, the dynamic state may correspond to a global motion of the one or more objects with reference to a ground plane, and a local motion of one or more parts of the one or more objects.

At any-time instant, the electronic apparatus may control a plurality of image-capture devices (for example, cameras) to capture portions of the image data at discrete time instants from a plurality of viewpoints in a 3D space. The electronic apparatus may generate a three-dimensional (3D) point cloud sequence, and extract motion information associated with the one or more objects, based on the received image data. In an embodiment, the motion information may include a set of motion vectors. The electronic apparatus may determine a first set of 3D points of a first point cloud frame that is in a static state with respect to a second set of 3D points of a second point cloud frame, based on the extracted motion information. The first point cloud frame and the second point cloud frame may correspond to consecutive frames of the 3D point cloud sequence. Thereafter, the electronic apparatus may determine a difference between the first set of 3D points and the second set of 3D points and update the first point cloud frame based on the determined difference.

In an embodiment, the disclosed electronic apparatus may update the 3D point cloud sequence based on the updated first point cloud frame, and generate a 3D video that includes a temporal sequence of 3D models based on a sequence of point cloud frames of the updated 3D point cloud sequence.

The present disclosure may provide a cost effective and an optimal solution to generate a 3D volumetric video with object motion that may appear smoother, flicker free (or with low temporal flicker), and continuous up to a certain number of frames as compared to some of the traditional volumetric videos. The disclosure eliminates use of complex and expensive specialized hardware/workflows for alignment of point cloud frames or calibration of cameras that capture the image data.

In an embodiment, the disclosed electronic apparatus may execute a point cloud registration operation (for example, an Iterative Closest Point (ICP) registration operation) to minimize the determined difference between the first set of 3D points and the second set of 3D points. In such a scenario, the first point cloud frame may be updated based on the minimization. This may reduce artifacts and discontinuity in the generated 3D video, thereby enhancing user experience associated with viewers of the 3D video.

FIG. 1 is a diagram that illustrates an exemplary network environment for sequence stabilization of 3D point cloud frames using motion information, in accordance with an embodiment of the disclosure. With reference to FIG. 1, there is shown a network environment 100. The network environment 100 may include an electronic apparatus 102, a server 104, and a plurality of image-capture devices 106. The electronic apparatus 102 and the server 104 may be communicatively coupled to each other via a communication network 108. In accordance with an embodiment, the electronic apparatus 102 may be directly interfaced with the plurality of image-capture devices 106, which may be mounted on a rigid support structure such as a multi-camera rig may be present in a 3D space 110.

The electronic apparatus 102 may include suitable logic, circuitry, interfaces, and/or code that may execute a sequence stabilization of 3D point cloud frames based on motion information associated with object(s) included in the 3D point cloud frames. Examples of the electronic apparatus 102 may include, but are not limited to, a computing device, an image-capture device, an image-processing device, a smartphone, a mobile phone, a gaming device, a wearable device, a head-mounted display, a mainframe machine, a distributed computing system (such as an edge computing system), a server, a computer workstation, and/or a consumer electronic (CE) device.

The plurality of image-capture devices 106 may include suitable logic, circuitry, and interfaces that may be configured to capture portions of the image data at discrete time instants and from a plurality of viewpoints in the 3D space 110. In an embodiment, the plurality of image-capture devices 106 may be mounted on the rigid support structure such as a multi-camera rig (as shown, for example, a dome-shaped cage structure). Examples of the image-capture device 106 may include, but are not limited to, an image sensor, a wide-angle camera, a camera with an integrated depth sensor, a cinematic camera, Digital Single-Lens Reflex (DSLR) camera, a Digital Single-Lens Mirrorless (DSLM) camera, an action camera, a camcorder, a digital camera, a camera phone, a time-of-flight camera (ToF camera), a 360-degree camera, and/or other image-capture devices.

The server 104 may include suitable logic, circuitry, interfaces, and/or code that may be configured to store the image data, and a three-dimensional (3D) point cloud sequence generated based on the image data. In an embodiment, the server 104 may be implemented as a cloud server and may execute operations through web applications, cloud applications, HTTP requests, repository operations, file transfer, and the like. Other example implementations of the server 104 may include, but are not limited to, a database server, a file server, a content server, a web server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure is not limited to the implementation of the server 104 and the electronic apparatus 102 as two separate entities. In certain embodiments, the functionalities of the server 104 may be incorporated in its entirety or at least partially in the electronic apparatus 102, without a departure from the scope of the disclosure.

The communication network 108 may include a communication medium through which the electronic apparatus 102 and the server 104 may be configured to communicate with each other. The communication network 108 may include one of a wired connection, a wireless connection, or a combination thereof. Examples of the communication network 108 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various other devices (not shown in the FIG) in the network environment 100 may be configured to connect each other via the communication network 108 in accordance with various wired and wireless communication protocols or a combination of protocols including both the wired protocols and the wireless protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic apparatus 102 may be configured to control the plurality of image-capture devices 106 to capture portions of the image data at discrete time instants and from a plurality of viewpoints in the 3D space 110. While capturing the portions of the image data, the plurality of image-capture devices 106 may be mounted at fixed (or dynamic) locations on the rigid support structure in the 3D space 110 (such as a 3D capture-studio).

In accordance with an embodiment, the rigid support structure, such as a multi-camera rig may be disposed in any environment, for example a recording studio, a public or private location, a sports stadium, an underwater environment, a skydiving environment, and the like. Each image-capture device may be placed such that the relative distance of each image-capture device is fixed with respect to other image-capture devices on the multi-camera rig. Also, each image-capture device may be disposed to face the one or more objects 112 from a specific viewpoint. Embodiments of the present disclosure may be also applicable to other types of multi-camera rigs, such as a cuboidal cage-like rig or a planar structure. Also, the person shown in FIG. 1 is merely an example of the one or more objects 112 for volumetric capture. The present disclosure may be applicable to other object types and sceneries (for example, a play that may be recorded in a studio setup) or a sports arena were a person is running or a football game is in progress. For the sake of brevity, a description of other types of objects or scenarios has been omitted from the present disclosure.

At any time-instant, the electronic apparatus 102 may receive the image data that may include images of the one or more objects 112. The image data may correspond to a duration in which in the one or more objects 112 are in a dynamic state. Herein, the dynamic state may correspond to a global motion of the one or more objects 112 with reference to a ground plane and/or a local motion of one or more parts of the one or more objects 112. For example, the one or more objects 112 may include a person whose movements may be recorded in the image data. For example, reception of the image data is described further, for example, in FIG. 3.

The electronic apparatus 102 may generate a three-dimensional (3D) point cloud sequence based on the image data. Each point cloud frame of the 3D point cloud sequence may be generated using a suitable 3D reconstruction technique. Examples of the 3D reconstruction technique may include, but are not limited to, a photogrammetry-based method (such as structure from motion (SfM)), a method which requires stereoscopic images, or a method which requires monocular cues (such as shape from shading (SfS), photometric stereo, or shape from texture (SfT)). Details of such techniques have been omitted from the disclosure for the sake of brevity.

The electronic apparatus 102 may extract motion information associated with the one or more objects 112 based on the image data, as described, for example, in FIG. 3. The motion information may describe a global motion of the one or more objects 112 with reference to a ground plane and/or a local motion of one or more parts of the one or more objects 112. For example, for each point cloud frame, the motion information may include a plurality of motion vectors corresponding to a plurality of regions (or samples) of the respective point cloud frame. The motion vectors may indicate relative movement of the one or more objects 112 between consecutive frames.

The electronic apparatus 102 may determine a first set of 3D points of a first point cloud frame that may be in a static state with respect to a second set of 3D points of a second point cloud frame. The first set of 3D points may be determined based on the extracted motion information, and both first point cloud frame and second point cloud frame may be consecutive frames of the 3D point cloud sequence. The determination of the first set of 3D points is further described, for example, in FIG. 3.

The electronic apparatus 102 may further determine a difference between the first set of 3D points and the second set of 3D points and may update the first point cloud frame based on the determined difference, as described, for example, in FIG. 3. In an embodiment, the electronic apparatus 102 may execute a point cloud registration operation (for example, iterative closest point (ICP)) to minimize the determined difference between the first set of 3D points and the second set of 3D points, thereby reducing artifacts and discontinuity between the generated 3D point cloud frames. The use of 2D motion information may help to may provide cost effective, computationally of low complexity, and an optimum solution for sequence stabilization of 3D point cloud frames, thereby eliminating use of very complex and expensive specialized hardware or workflows.

In an embodiment, the disclosed electronic apparatus may update the 3D point cloud sequence based on the updated first point cloud frame. The foregoing operations may be iteratively executed for all remaining consecutive point cloud frames of the 3D point cloud sequence to produce a final 3D point cloud sequence. The final 3D point cloud sequence (i.e., the updated point cloud sequence after several iterations) may be used to generate a 3D video 114 that may include a temporal sequence of 3D models. The 3D video 114 may be a 3D stabilized sequence, with almost zero to a minimum amount of temporal flicker or discontinuity between frames.

Figure 2:
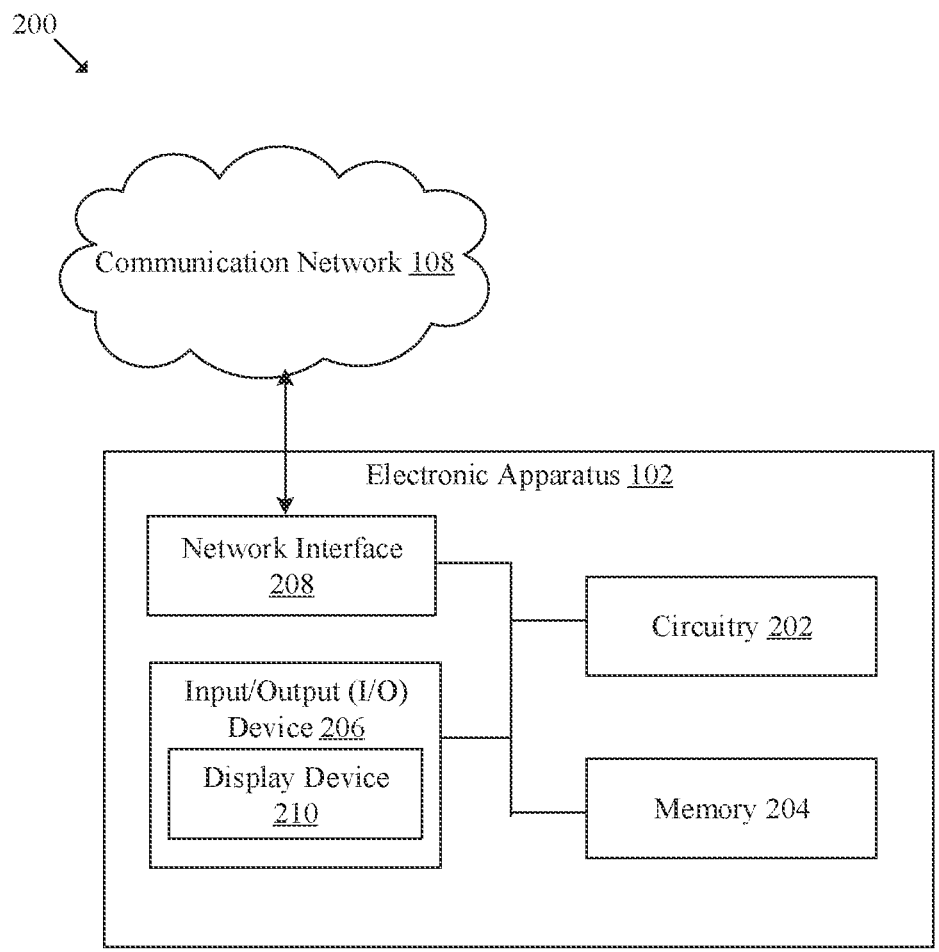
FIG. 2 is a block diagram that illustrates an exemplary electronic apparatus of FIG. 1, in accordance with an embodiment of the disclosure.

FIG. 2 is a block diagram that illustrates an exemplary electronic apparatus of FIG. 1, in accordance with an embodiment of the disclosure. FIG. 2 is explained in conjunction with elements from FIG. 1. With reference to FIG. 2, there is shown the electronic apparatus 102. The electronic apparatus 102 may include circuitry 202, a memory 204, an input/output (I/O) device 206, and a network interface 208. The I/O device 206 may include a display device 210. The network interface 208 may connect the electronic apparatus 102 with the server 104, via the communication network 108.

The circuitry 202 may include suitable logic, circuitry, and/or interfaces that may be configured to execute program instructions associated with different operations to be executed by the electronic apparatus 102. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on several processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The memory 204 may be configured to store the image data. The memory 204 may store the 3D point cloud sequence generated based on the image data. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include various input and output devices, which may be configured to communicate with the circuitry 202. In an example, the electronic apparatus 102 may display (via the display device 210 associated with the I/O device 206) the generated 3D video 114. Examples of the I/O device 206 may include, but are not limited to, a touch screen, a keyboard, a mouse, a joystick, a display device (for example, the display device 210), a microphone, or a speaker.

The display device 210 may include suitable logic, circuitry, and interfaces that may be configured to display the generated 3D video 114. The display device 210 may be a touch screen which may enable a user to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display.

The network interface 208 may include suitable logic, circuitry, interfaces, and/or code that may be configured to facilitate communication between the electronic apparatus 102, and the server 104, via the communication network 108. The network interface 208 may be implemented by use of various known technologies to support wired or wireless communication of the electronic apparatus 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth®, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Figure 3A:
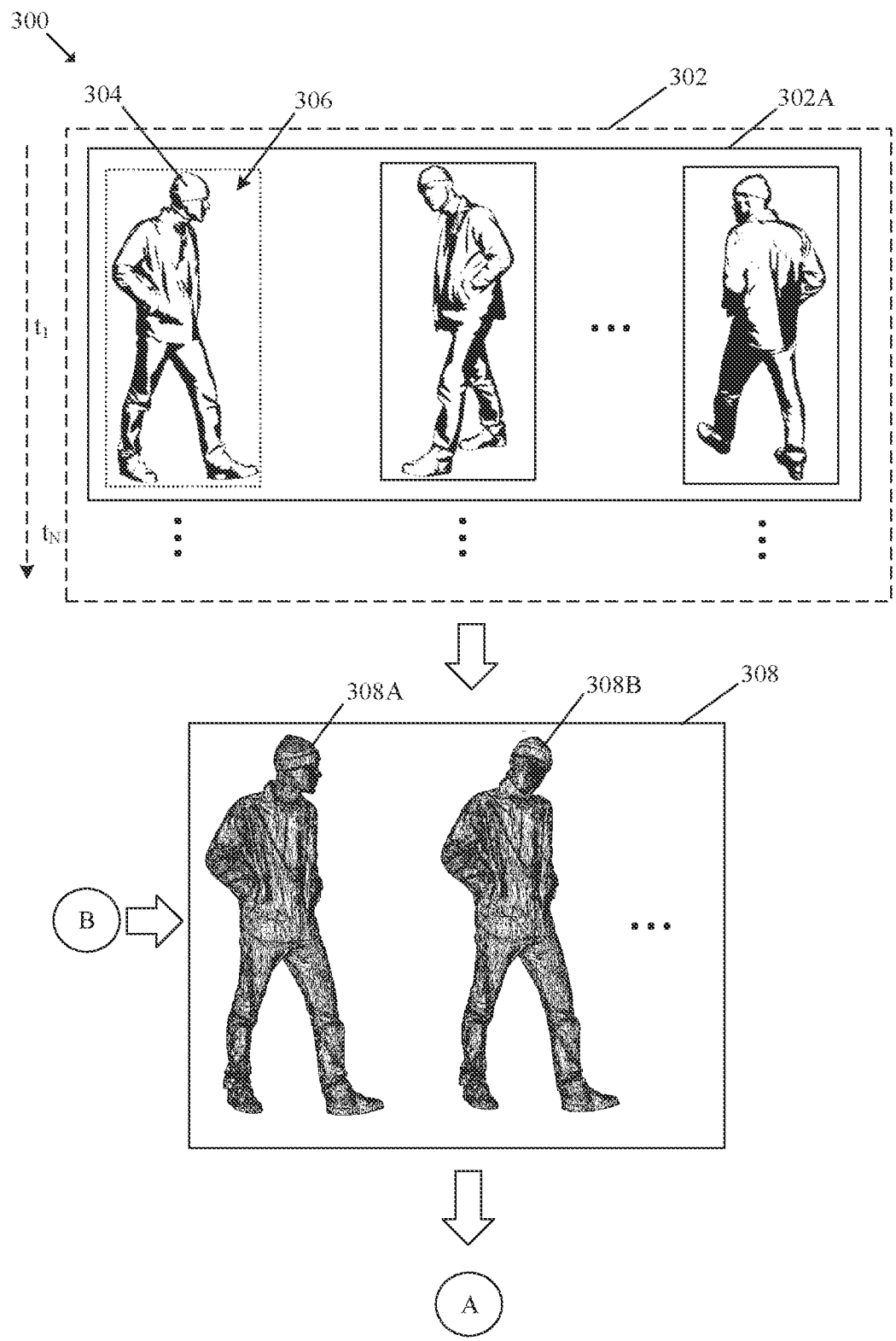
FIGS. 3A and 3B are diagrams that collectively illustrate exemplary operations for sequence stabilization of 3D point cloud frames using motion information, in accordance with an embodiment of the disclosure.
Figure 3B:
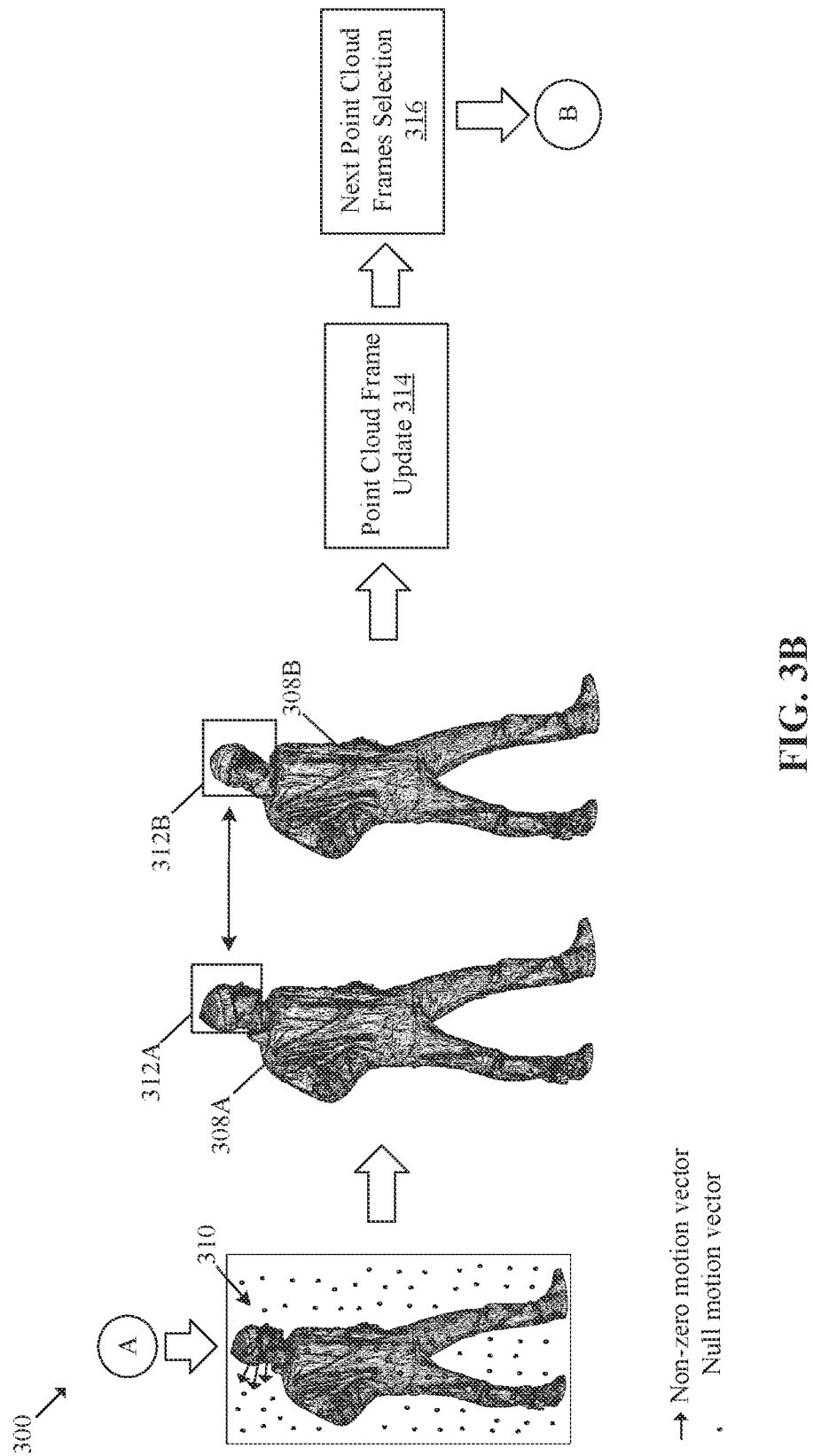
Figure 4:
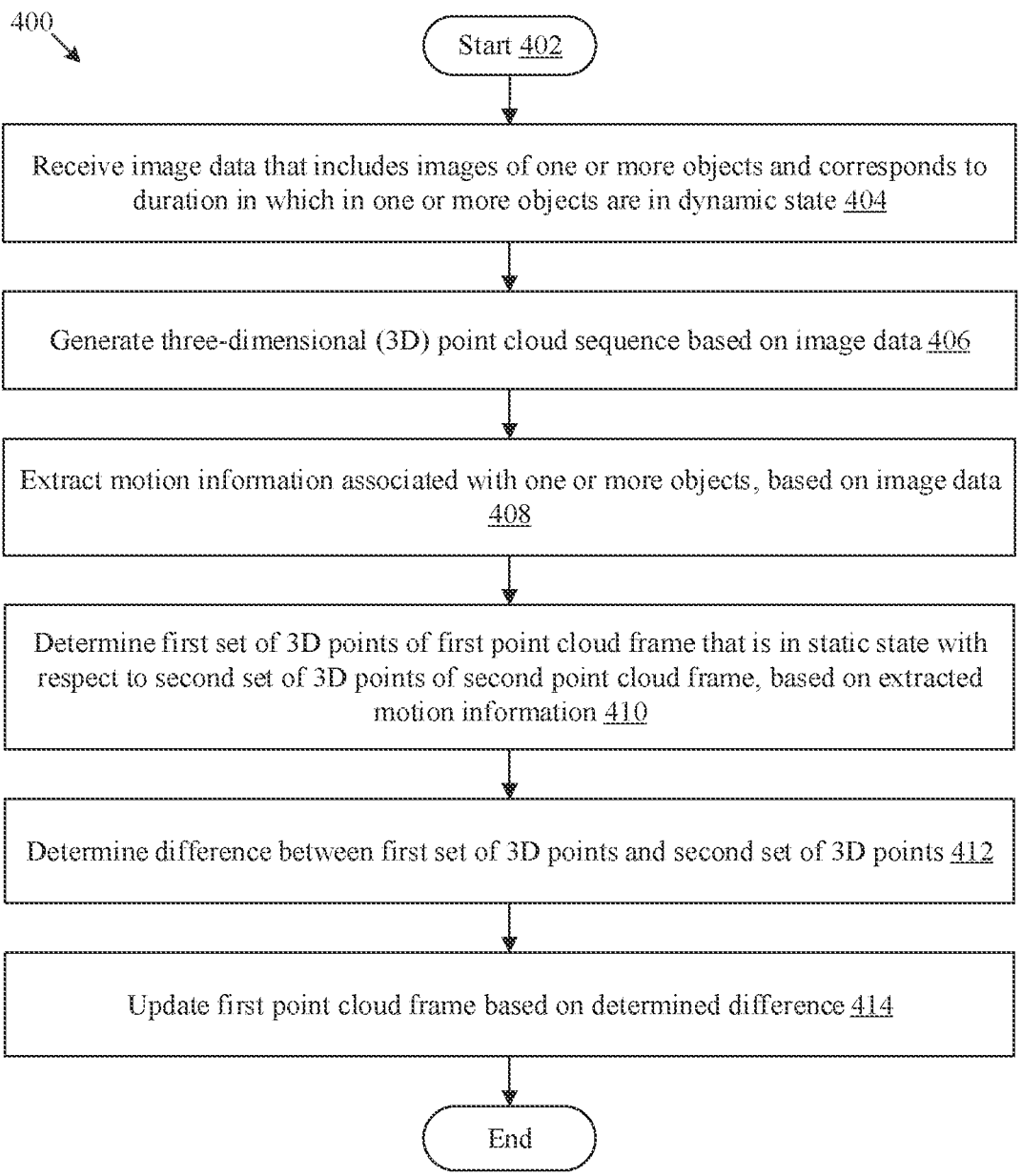
FIG. 4 is a flowchart that illustrates exemplary operations for sequence stabilization of 3D point cloud frames using motion information, in accordance with an embodiment of the disclosure.

Various operations of the circuitry 202 for sequence stabilization of 3D point cloud frames using motion information are described further, for example, in FIGS. 3A, 3B, and 4.

FIGS. 3A and 3B are diagrams that collectively illustrate exemplary operations for sequence stabilization of 3D point cloud frames using motion information, in accordance with an embodiment of the disclosure. FIGS. 3A and 3B are explained in conjunction with elements of FIGS. 1 and 2. With reference to FIGS. 3A, and 3B, there is shown a pipeline 300 that illustrates exemplary operations for sequence stabilization of 3D point cloud frames using motion information. The exemplary operations illustrated in the pipeline 300 may be performed by any computing system, apparatus, or device, such as by the electronic apparatus 102 of FIG. 1, or the circuitry 202 of FIG. 2.

At any time-instant, the circuitry 202 may be configured to control a plurality of image-capture devices (for example, the plurality of image-capture devices 106) to capture portions of image data 302 at discrete time instants from a plurality of viewpoints in the 3D space 110.

In an embodiment, each portion of the image data 302 may be captured by a corresponding image-capture device of the plurality of image-capture device 106. The plurality of image-capture devices 106 may be controlled by means of clock signals generated directly by the circuitry 202, a multi-camera shutter controller, or one of the plurality of image-capture devices 106. Such signals may configure and/or trigger the plurality of image-capture devices 106 to capture portions of the image data 302 at discrete time instants (for example, 1 second). The configuration may include, for example, a specific frame rate, a shutter speed, a trigger duration (or capture-duration), a sensor gain, and the like.

In an embodiment, the plurality of image-capture devices 106 may be configured to capture portions of the image data 302 at a frame rate that may be above a pre-defined threshold (for example, 60 frames per second or 120 frames per second). In another embodiment, the plurality of image-capture devices 106 may be configured to acquire images at a constant frame rate. In both embodiments, the shutter speed of each image-capture device may either remain constant or may vary.

For example, in the FIG. 3A, there is shown portions of the image data 302, captured by the plurality of image-capture devices 106, at discrete time instants (such as time $t_1, t_2, \ldots, t_N$) from a plurality of viewpoints in the 3D space 110. A first portion 302A of the image data 302 may be captured by the plurality of image-capture devices 106 at a first time-instant from a plurality of viewpoints in the 3D space 110. Similarly, a second portion, a third portion, or an Nth portion of the image data 302 may be captured by the plurality of image-capture devices 106 at other subsequent time-instants from a plurality of viewpoints in the 3D space 110.

The circuitry 202 may be configured to receive the image data 302 (captured by the plurality of image-capture devices 106). The image data 302 may include images of one or more objects 112 and may correspond to a duration in which in the one or more objects 112 may be in a dynamic state. The dynamic state may correspond to a global motion of the one or more objects 112 with reference to a ground plane, and a local motion of one or more parts of the one or more objects 112. For example, FIG. 3A shows a person 304 (i.e., an object) standing in a room 306 (i.e., the 3D space 110). The global motion may correspond to movement of the person 304 with reference to a ground plane (such as a floor of the room 306). In certain instances, various reference markers may be placed on the floor to determine the ground plane. The global motion may be determined based on the reference markers on the floor and the local motion may correspond to movement of one or more parts (for example, arms, legs, face, and the like) of the person 304. For example, FIG. 3A depicts the local motion as a movement of the arm of the person 304.

The circuitry 202 may be configured to generate a three-dimensional (3D) point cloud sequence 308 based on the image data 302. The 3D point cloud sequence 308 may include a set of point cloud frames, each of which may be generated based on a corresponding portion of the image data 302. As shown, for example, in FIG. 3A, the 3D point cloud sequence 308 includes a first point cloud frame 308A, a second point cloud frame 308B, . . . , and an Nth point cloud frame (not shown)) corresponding to respective portions of the image data 302.

Each point cloud frame of the 3D point cloud sequence may be generated using a suitable 3D reconstruction technique. Examples of the 3D reconstruction technique may include, but are not limited to, a photogrammetry-based method (such as SfM), a method which requires stereoscopic images, or a method which requires monocular cues (such as SfS, photometric stereo, or SfT). Details of such techniques have been omitted from the disclosure for the sake of brevity.

In an embodiment, the circuitry 202 may be further configured to sample 3D points of each point cloud frame of the 3D point cloud sequence 308 into clusters. For example, the circuitry 202 may be configured to use a suitable sampling technique to sample the 3D points of each point cloud frame of the 3D point cloud sequence 308 into clusters. Examples of clustering methods may include, but not limited to K-means, spectral clustering, mean-shift, affinity propagation, and density-based spectral clustering of application with noise. Detailed implementation of such clustering methods may be known to one skilled in the art; therefore, a detailed description of such methods has been omitted from the disclosure for the sake of brevity. In an embodiment, a size of each of the clusters may be associated with a count of visual features or a spatial arrangement of the visual features in the one or more objects 112. For example, the clusters may be formed based on feature-based extraction of the one or more objects 112. In another embodiment, a size of each of the clusters may be associated with a point density parameter associated with the 3D point cloud sequence 308. For example, the 3D points of each point cloud frame of the 3D point cloud sequence 308 may be sampled into clusters using a density-based clustering. This may use density parameter as a termination condition, manage noise in the clusters, and identify clusters of arbitrary size with outliers. In certain instances, if a cluster of points in the point cloud frame has a low density (i.e., below a threshold), then the circuitry 202 may determine such a cluster as a noise.

In an embodiment, the circuitry 202 may be configured to extract motion information associated with the one or more objects 112, based on the image data 302. By way of example, and not limitation, the motion information may include a set of motion vectors 310 corresponding to the clusters. The set of motion vectors 310 may be indicative of an offset in points of one point cloud frame to that of a reference point cloud frame. The direction and length of each vector may represent an extent of offset between the points of two consecutive point cloud frames in specific directions.

Based on the extracted motion information, the circuitry 202 may be configured to determine a first set of 3D points 312A of the first point cloud frame 308A that may be in a static state with respect to a second set of 3D points 312B of the second point cloud frame 308B. The first point cloud frame 308A and the second point cloud frame 308B may be consecutive frames of the 3D point cloud sequence 308. It may be assumed that the size/length of motion vectors may be zero (or below a threshold) for points that may be determined as static. FIG. 3B depicts such vectors with a circular black dot to represent a null vector. For such static points, there may be a negligible or a zero offset between motion vectors corresponding to the first point cloud frame 308A and the second point cloud frame 308B. If there is a variation in motion vectors corresponding to the first set of 3D points 312A of the first point cloud frame 308A with respect to that of the second set of 3D points 312B of the second point cloud frame 308B, then the first set of 3D points 312A of the first point cloud frame 308A may be determined to be in a dynamic state.

Based on a determination that the first set of 3D points 312A of the first point cloud frame 308A are in a static state with respect to the second set of 3D points 312B of the second point cloud frame 308B, the circuitry 202 may be configured to determine a difference between the first set of 3D points 312A and the second set of 3D points 312B.

At 314, the first point cloud frame 308A may be updated. The update may be required to minimize the difference (or a relative offset) between the first set of 3D points 312A and the second set of 3D points 312B. In an embodiment, the circuitry 202 may be configured to update the first point cloud frame 308A based on the determined difference. The update may align static points in both the consecutive point cloud frames, thereby imparting smoothness (and reduced artifacts, discontinuity, or temporal flicker between the frames) to the 3D point cloud sequence 308.

In an embodiment, the circuitry 202 may be further configured to execute a point cloud registration operation to minimize the determined difference between the first set of 3D points 312A and the second set of 3D points 312B. The first point cloud frame 308A may be updated based on the minimization. As an example, the point cloud registration operation may be an Iterative Closest Point (ICP) registration operation that may be used to determine a transformation that optimally aligns the first set of 3D points 312A with the second set of 3D points 312B. Detailed implementation of the point cloud registration operation may be known to one skilled in the art; therefore, a detailed description of such operations has been omitted from the disclosure for the sake of brevity.

In an embodiment, the circuitry 202 may be further configured to determine, from the plurality of image-capture devices 106, an image-capture device as out-of-sync with respect to remaining image-capture devices of the plurality of image-capture device 106. The image-capture device may be determined as out-of-synch based on the determined difference. For example, if the image-capture device is out-of-sync, points of a point cloud frame generated corresponding to the portion of the image data captured by the image-capture device may not align well with corresponding points of an adjacent point cloud frame. As a result, the ICP registration operation executed on such points may fail.

At 316, the next point cloud frames may be selected. In an embodiment, the circuitry 202 may be configured to select consecutive point cloud frames from the 3D point cloud sequence 308. Operations described in the FIGS. 3A and 3B until 314 may be repeated for the selected point cloud frames. The operations may be executed iteratively until last frame (such as the Nth point cloud frame) of the 3D point cloud sequence 308 is processed for alignment.

In an embodiment, the circuitry 202 may be further update the 3D point cloud sequence based on the updated first point cloud frame. The circuitry 202 may be further configured to generate a 3D video (such as a 3D volumetric video 114) that includes a temporal sequence of 3D models based on a sequence of point cloud frames of the updated 3D point cloud sequence. The generation of the 3D video may include, for example, concatenation of the temporal sequence of 3D models. A 3D model may be a 3D graphical model that may resemble the actual shape of a particular object. Typically, the 3D model of one or more objects may be rendered from a 3D mesh that may use polygonal surfaces to define a shape and geometry of the one or more objects. The 3D model of the one or more objects may realistically represent the surface features. In some exemplary scenarios, the 3D model may be further rendered in a Virtual Reality (VR) or Augmented Reality (AR) environment to represent the (insert name of object). The application of the 3D point cloud sequence of the object portion may include animations in video games, Visual Effects (VFX), Computer-Generated Imagery (CGI), and a 3D model-based video conferencing.

FIG. 4 is a flowchart that illustrates exemplary operations for sequence stabilization of 3D point cloud frames using motion information, in accordance with an embodiment of the disclosure. FIG. 4 is described in conjunction with elements from FIGS. 1, 2, 3A, and 3B. With reference to FIG. 4, there is shown a flowchart 400. The flowchart 400 may include operations from 402 to 414 and may be implemented by the electronic apparatus 102 of FIG. 1 or by the circuitry 202 of FIG. 2. The flowchart 400 may start at 402 and proceed to 404.

At 404, image data 302 may be received. The data 302 may include images of the one or more objects 112 and the data 302 may correspond to a duration in which the one or more objects 112 are in a dynamic state. In an embodiment, the circuitry 202 may receive the image data 302, as described, for example, in FIG. 3.

At 406, a three-dimensional (3D) point cloud sequence may be generated based on the image data. In an embodiment, the circuitry 202 may generate the 3D point cloud sequence 308 based on the image data 302, as described, for example, in FIG. 3.

At 408, motion information associated with the one or more objects may be extracted based on the image data. In an embodiment, the circuitry 202 may extract motion information associated with the one or more objects 112, based on the image data 302, as described, for example, in FIG. 3.

At 410, the first set of 3D points of a first point cloud frame that may be in a static state with respect to a second set of 3D points of a second point cloud frame may be determined, based on the extracted motion information. In an embodiment, the circuitry 202 may determine the first set of 3D points of the first point cloud frame 308A that is in a static state with respect to a second set of 3D points of the second point cloud frame 308B, based on the extracted motion information. The first point cloud frame 308A and the second point cloud frame 308B may be consecutive frames of the 3D point cloud sequence 308. The determination of the first set of 3D points of the first point cloud frame 308A is described, for example, in FIG. 3.

At 412, a difference between the first set of 3D points and the second set of 3D points may be determined. In an embodiment, the circuitry 202 may determine the difference between the first set of 3D points and the second set of 3D points, as described, for example, in FIG. 3.

At 414, the first point cloud frame may be updated. In an embodiment, the circuitry 202 may update the first point cloud frame based on the determined difference. The update of the first point cloud frame is described, for example, in FIG. 3. Control may pass to end.

Although the flowchart 400 is illustrated as discrete operations, such as 404, 406, 408, 410, 412, and 414, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic apparatus (for example, the electronic apparatus 102). The computer-executable instructions may cause the electronic apparatus 102 to perform operations that include reception of image data 302 that includes images of one or more objects 112 and corresponds to a duration in which in the one or more objects 112 are in a dynamic state. The operations may further include generation of a three-dimensional (3D) point cloud sequence 308 based on the image data 302. The operations may further include extraction of motion information associated with the one or more objects 112, based on the image data 302. The operations may further include determination of a first set of 3D points of a first point cloud frame 308A that is in a static state with respect to a second set of 3D points of a second point cloud frame 308B, based on the extracted motion information. The first point cloud frame 308A and the second point cloud frame 308B may be consecutive frames of the 3D point cloud sequence. The operations may further include determination of difference between the first set of 3D points and the second set of 3D points. The operations may further include update of the first point cloud frame based on the determined difference Exemplary aspects of the disclosure may provide an electronic apparatus (such as the electronic apparatus 102 of FIG. 1) that includes circuitry (such as the circuitry 202) may receive image data 302 that includes images of one or more objects 112 and corresponds to a duration in which in the one or more objects 112 are in a dynamic state. The circuitry 202 may generate a three-dimensional (3D) point cloud sequence 308 based on the image data 302. The circuitry 202 may extract motion information associated with the one or more objects 112, based on the image data 302. The circuitry 202 may determine a first set of 3D points of a first point cloud frame 308A that is in a static state with respect to a second set of 3D points of a second point cloud frame 308B, based on the extracted motion information. The first point cloud frame 308A and the second point cloud frame 308B may be consecutive frames of the 3D point cloud sequence 308. The circuitry 202 may determine a difference between the first set of 3D points and the second set of 3D points. The circuitry 202 may update the first point cloud frame 308A based on the determined difference.

In an embodiment, the circuitry 202 may be further configured to control a plurality of image-capture devices 106 to capture portions of the image data 302 at discrete time instants from a plurality of viewpoints in a 3D space 110.

In an embodiment, the circuitry 202 may be configured to determine, from the plurality of image-capture devices 106, an image-capture device as out-of-sync with respect to remaining image-capture devices of the plurality of image-capture device 106. The image-capture device may be determined as out-of-synch based on the determined difference.

In an embodiment, the circuitry 202 may be further configured to sample 3D points of each point cloud frame of the point cloud sequence into clusters. The motion information may include a set of motion vectors corresponding to the clusters.

In an embodiment, a size of each of the clusters may be associated with a count of visual features or a spatial arrangement of the visual features in the one or more objects 112.

In an embodiment, a size of each of the clusters may be associated with a point density parameter associated with the point cloud sequence.

In an embodiment, the dynamic state may correspond to a global motion of the one or more objects 112 with reference to a ground plane, and a local motion of one or more parts of the one or more objects 112.

In an embodiment, the circuitry 202 may be further configured to execute a point cloud registration operation to minimize the determined difference between the first set of 3D points and the second set of 3D points. The first point cloud frame may be updated based on the minimization.

In an embodiment, the point cloud registration operation may be an Iterative Closest Point (ICP) registration operation.

In an embodiment, the circuitry 202 may be further configured to update the 3D point cloud sequence 308 based on the updated first point cloud frame 308A. The circuitry 202 may be further configured to generate a 3D video 114 that includes a temporal sequence of 3D models based on a sequence of point cloud frames of the updated 3D point cloud sequence.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic apparatus, comprising:
    circuitry configured to:
        receive image data that includes images of at least one object, wherein the image data corresponds to a duration in which the at least one object is in a dynamic state;
        generate a three-dimensional (3D) point cloud sequence based on the image data;
        extract motion information associated with the at least one object, based on the image data;
        control a plurality of image-capture devices to capture portions of the image data at discrete time instants from a plurality of viewpoints in a 3D space;
        determine, from the plurality of image-capture devices, an image-capture device as out-of-sync with respect to remaining image-capture devices of the plurality of image-capture devices;
        determine a first set of 3D points of a first point cloud frame that is in a static state with respect to a second set of 3D points of a second point cloud frame, based on the extracted motion information and the remaining image-capture devices,
            wherein the first point cloud frame and the second point cloud frame are consecutive frames of the 3D point cloud sequence;
        determine a difference between the first set of 3D points, that is in the static state with respect to the second set of 3D points, and the second set of 3D points, wherein the image-capture device is determined as out-of-sync based on the determined difference; and
        update the first point cloud frame based on the determined difference.

2. The electronic apparatus according to claim 1, wherein the circuitry is further configured to sample 3D points of each point cloud frame of the 3D point cloud sequence into a plurality of clusters, and
    the motion information comprises a set of motion vectors corresponding to the plurality of clusters.

3. The electronic apparatus according to claim 2, wherein a size of each of the plurality of clusters is associated with a count of visual features or a spatial arrangement of the visual features in the at least one object.

4. The electronic apparatus according to claim 2, wherein a size of each of the plurality of clusters is associated with a point density parameter associated with the 3D point cloud sequence.

5. The electronic apparatus according to claim 1, wherein the dynamic state corresponds to:
    a global motion of the at least one object with reference to a ground plane, and
    a local motion of at least one part of the at least one object.

6. The electronic apparatus according to claim 1, wherein the circuitry is further configured to execute a point cloud registration operation to minimize the determined difference between the first set of 3D points and the second set of 3D points, and
    the first point cloud frame is updated based on the minimization.

7. The electronic apparatus according to claim 6, wherein the point cloud registration operation is an Iterative Closest Point (ICP) registration operation.

8. The electronic apparatus according to claim 1, wherein the circuitry is further configured to:
    update the 3D point cloud sequence based on the updated first point cloud frame; and
    generate a 3D video that includes a temporal sequence of 3D models based on a sequence of point cloud frames of the updated 3D point cloud sequence.

9. A method, comprising:
    in an electronic apparatus:
        receiving image data that includes images of at least one object, wherein the image data corresponds to a duration in which the at least one object is in a dynamic state;
        generating a three-dimensional (3D) point cloud sequence based on the image data;
        extracting motion information associated with the at least one object, based on the image data;
        controlling a plurality of image-capture devices to capture portions of the image data at discrete time instants from a plurality of viewpoints in a 3D space;
        determining, from the plurality of image-capture devices, an image-capture device as out-of-sync with respect to remaining image-capture devices of the plurality of image-capture devices;
        determining a first set of 3D points of a first point cloud frame that is in a static state with respect to a second set of 3D points of a second point cloud frame, based on the extracted motion information and the remaining image-capture devices,
            wherein the first point cloud frame and the second point cloud frame are consecutive frames of the 3D point cloud sequence;
        determining a difference between the first set of 3D points, that is in the static state with respect to the second set of 3D points, and the second set of 3D points, wherein
            the image-capture device is determined as out-of-sync based on the determined difference; and
        updating the first point cloud frame based on the determined difference.

10. The method according to claim 9, further comprising sampling 3D points of each point cloud frame of the 3D point cloud sequence into a plurality of clusters, wherein the motion information comprises a set of motion vectors corresponding to the plurality of clusters.

11. The method according to claim 10, wherein a size of each of the plurality of clusters is associated with a count of visual features or a spatial arrangement of the visual features in the at least one object.

12. The method according to claim 10, wherein a size of each of the plurality of clusters is associated with a point density parameter associated with the 3D point cloud sequence.

13. The method according to claim 9, wherein the dynamic state corresponds to:
   a global motion of the at least one object with reference to a ground plane, and
   a local motion of at least one part of the at least one object.

14. The method according to claim 9, further comprising executing a point cloud registration operation to minimize the determined difference between the first set of 3D points and the second set of 3D points, wherein the first point cloud frame is updated based on the minimization.

15. The method according to claim 14, wherein the point cloud registration operation is an Iterative Closest Point (ICP) registration operation.

16. A non-transitory computer-readable medium having stored thereon, computer-executable instructions that when executed by a computer, causes the computer to execute operations, the operations comprising:
   receiving image data that includes images of at least one object, wherein the image data corresponds to a duration in which the at least one object is in a dynamic state;
   generating a three-dimensional (3D) point cloud sequence based on the image data;
   extracting motion information associated with the at least one object, based on the image data;
   controlling a plurality of image-capture devices to capture portions of the image data at discrete time instants from a plurality of viewpoints in a 3D space;
   determining, from the plurality of image-capture devices, an image-capture device as out-of-sync with respect to remaining image-capture devices of the plurality of image-capture devices;
   determining a first set of 3D points of a first point cloud frame that is in a static state with respect to a second set of 3D points of a second point cloud frame, based on the extracted motion information and the remaining image-capture devices,
      wherein the first point cloud frame and the second point cloud frame are consecutive frames of the 3D point cloud sequence;
   determining a difference between the first set of 3D points, that is in the static state with respect to the second set of 3D points, and the second set of 3D points, wherein
      the image-capture device is determined as out-of-sync based on the determined difference; and
   updating the first point cloud frame based on the determined difference.

\* \* \* \* \*